March 13, 1962     I. H. POLK     3,024,521

PLANIFORM FACED VESSELS

Filed Aug. 29, 1957     2 Sheets-Sheet 1

INVENTOR.
Isaac H. Polk
BY
E. C. Vandenburgh
Atty.

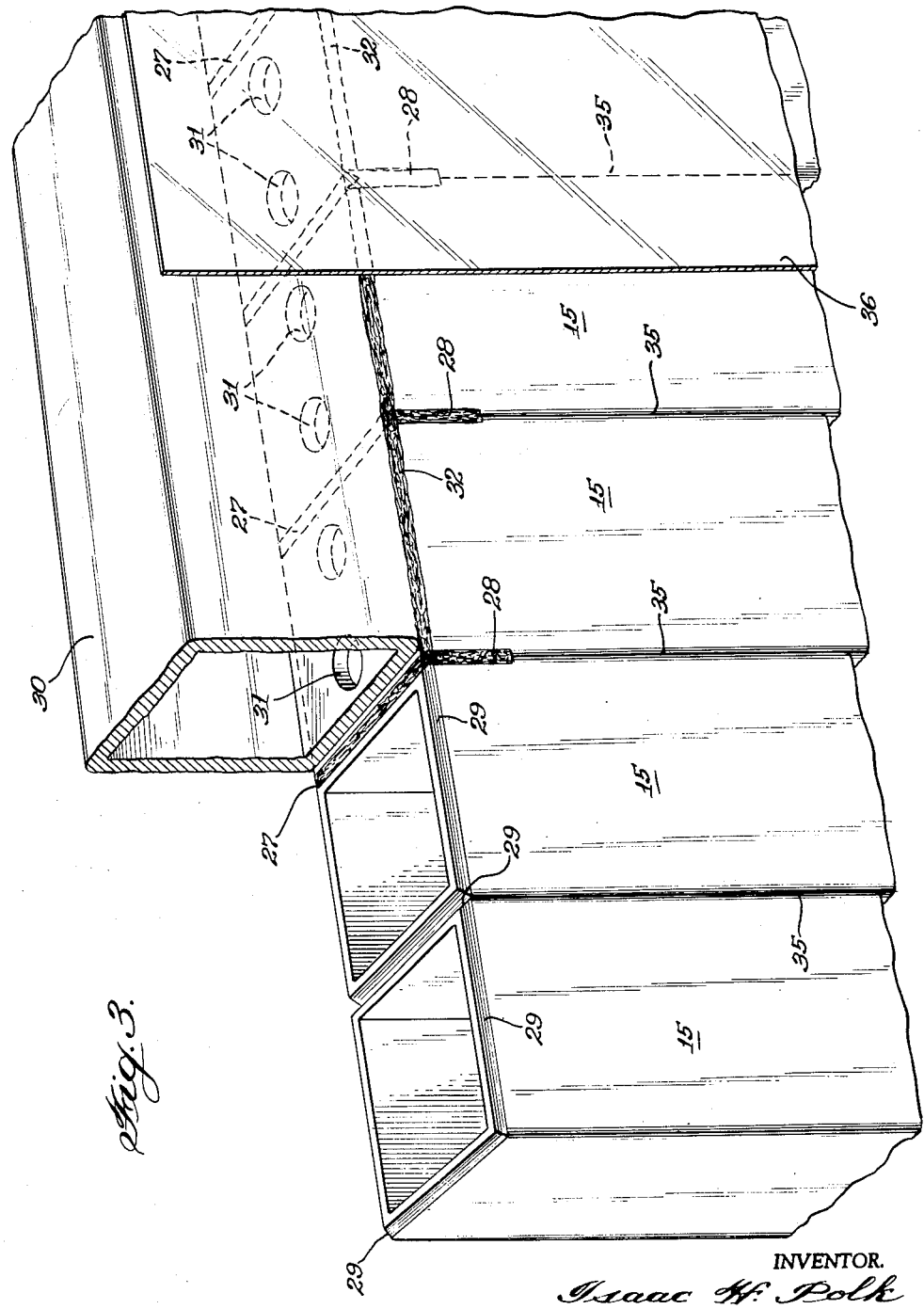

3,024,521
PLANIFORM FACED VESSELS
Isaac H. Polk, San Jose, Calif., assignor to Cyclomatic Freezing Systems, Inc., Chicago, Ill., a corporation of Delaware
Filed Aug. 29, 1957, Ser. No. 680,955
9 Claims. (Cl. 29—157.3)

The present invention relates to a method of manufacturing vessels having at least one planiform face and to the resultant product produced by said method.

In numerous applications, for example heating, freezing, etc., it is necessary to have vessels having a relatively flat, i.e. planiform, outer face. The process generally employed at the present time to produce such a vessel is to form the vessel from two flat metal sheets. The sheets are spaced from each other by a plurality of metal studs, the ends of which are welded to the metal sheets. Channels, "I" beams, tubing, etc., are used at times in place of studs. The periphery is formed by metal sides welded to the two sheets. Even when the welding is carefully performed, the heat of the welding process acts to warp the metal sheets. Despite the fact that the metal sides were planiform when the fabrication of the vessel commenced, the warping caused by the heat results in a lack of planiformity of the finished vessel. To correct this, the complete vessel is placed in a heat treatment oven and subjected to normalizing temperatures, e.g. 1200° F., usually along with mechanical pressures. Often the heating and mechanical pressure will produce the desired planiformity of the faces. In other cases only a partial straightening will result, but it will be sufficiently close to permit the faces to be machined flat. In still other instances the vessel is so badly warped that it must be discarded and another one produced as a substitute. One of the important factors in producing satisfactory vessels is the skill of the welder. A welder having a great deal of experience in this work will produce less "rejects," vessels that cannot be salvaged, than will a person who may be a good welder but who has less experience in the particular work.

The larger the planiform face required the greater is the difficulty encountered. The larger area involved requires more studs and usually means less overall rigidity in the side plates, both of which contribute to increased deflections that must be removed by heat treatment. Furthermore, larger ovens and mechanical pressure apparatus is required to handle the larger vessel, both of which involve substantially greater capital investment. If machining is employed to endeavor to salvage at least some of the vessels that cannot be completely straightened by heat treatment and mechanical pressure, the machining equipment must be larger. Experience has indicated that the largest vessels that can be produced economically by this method is in the range of fifty square feet.

The prinicipal object of the present invention is to provide planiform faced vessels of substantially any size while at the same time obviating the difficulties that are encountered in employing the present practices. No heat treatment or mechanical straightening are required after the vessel has been formed. Using the process I have devised vessels having faces with a high degree of planiformity may be produced. If optimum planiformity is required, it may be necessary to machine the faces of the finished vessel, but my process is still advantageous because the vessel will have such good planiformity to start with that it will be necessary to remove only a small amount of metal in the machining process to obtain the required planiformity. However, the process I have devised will produce sufficient planiformity for most applications.

One of the great advantages of my process is that it employs standard metal shapes in the fabrication of the vessel. I am aware that in the past there have been proposals to form vessels having a tubular configuration, such as is produced by my process, but such suggestions have required the use of specially fabricated shapes. My process permits the use of standard metal shapes even though the makers of such tubing will not guarantee it to be perfectly straight inasmuch as some twisting and bending of the tubing is inherent in its process of manufacture. Thus, not only is it not necessary to go to the trouble of forming special shapes, but the costs are held to a minimum by the use of readily available material.

Other objects and advantages include: any skilled welder can be employed in the manufacture of the vessels even if he has not had previous special experience in this field; with substantially the same capital investment, about any size of vessel may be produced since it can be formed in sections, which sections are planiform and may be assembled readily into a finished vessel of the required size; and vessels able to withstand substantially any internal pressure may be produced, since the strength of the finished vessel will be a direct function of the strength of the tubing employed with the tubing being chosen to serve the purpose.

Additional objects and advantages will be apparent from the following description taken in conjunction with the drawings in which:

FIGURE 3 is an illustrative isometric view of a portion of a vessel produced in accordance with the present invention.

Figures 1, 2:
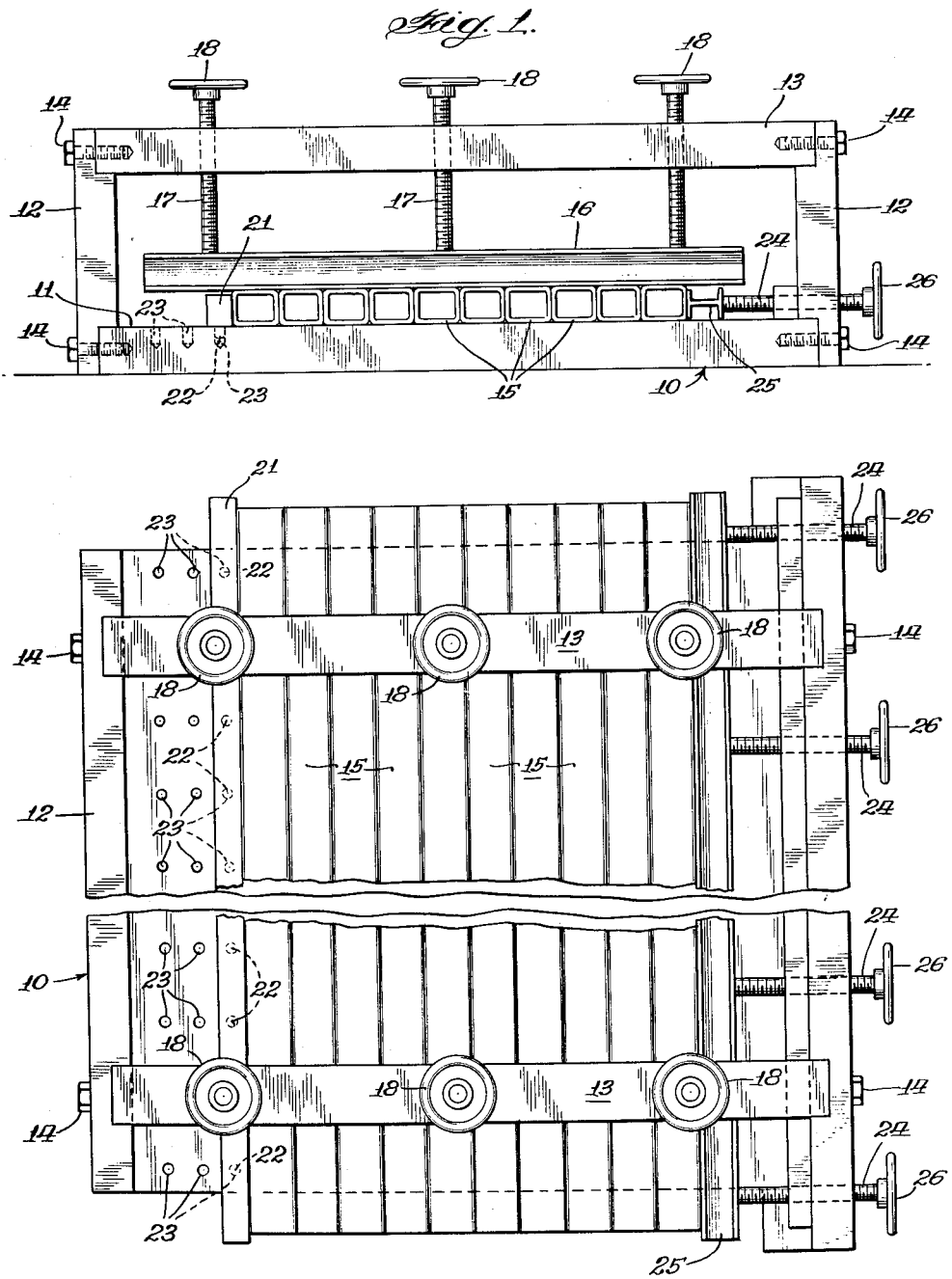
FIGURE 1 is a side elevation of one embodiment of an apparatus employed in the fabrication of a vessel, or a section thereof, in accordance with the present invention.
FIGURE 2 is a plan view of the apparatus of FIGURE 1.

In the process I have devised the vessel is formed of a plurality of tubes having a rectangular cross section. Depending upon the size of the finished vessel and the size of the face or bed plate available, the whole vessel may be formed at one time or it may be formed in a number of sections with the sections being subsequently assembled into the finished vessel. Normally the length of the tubes will be equal to the width, i.e. the narrower dimension, of the finished vessel, or the width less the size of the headers employed at the ends of the tubes. In this case the total number of tubes employed will be determined by the length of the finished vessel divided by the width of each tube in the plane of the face of the vessel. In some embodiments, depending upon the size of the vessel, the rigidity of the tubing employed, the loads, if any, to be resisted by the face of the vessel, etc., the tubes could run the length rather than the width of the face of the vessel.

Assuming that the vessel is to be produced in sections rather than as one piece, the number of tubes in a section will be selected primarily dependent upon the size of the face plate to be used in the manufacture of the vessel. It is desirable that the largest number of tubes that can be accommodated on the face plate available to be used in the fabrication of each section. In no event should a section consist of less than about four or five tubes, and I prefer to form each section with at least seven or eight tubes. If too few tubes are used for each section, there will be insufficient rigidity to each section to give the required planiformity and to eliminate twists or bends in the tubing. Furthermore, the final assembly process becomes more involved.

The tubes for each section are juxtaposed and positioned with one of the exposed faces of each of the tubes in a common plane. The tubes are held firmly in this position while they are secured together. The preferable way of holding the tubes in this position is to place the tubes against a face plate, i.e. a rigid plate having a planiform face against which the tubes are positioned. Other means of obtaining a plane could be used such as a plurality of "I" beams, one side of which formed a plane. The tubes are clamped together while being held firmly against the face plate. The pressure applied by the clamps should be sufficient to eliminate any twists or bends in the tubing. While holding the tubes in this position the tubes are welded together substantially only at the ends of the tubes. Depending upon the materials employed, the strength necessary in the joints, etc., other well known methods of heat fusing might be used, e.g. soldering, brazing, and the term welding as employed herein is deemed to include these well known variations.

It is important that the welding be confined to substantially only the ends of the tubes so as not to introduce the distortions that have plagued workers in the art in forming vessels in the conventional manner. The major portion of the welding is only at or extending a short distance from the ends of the tubes. There is the possibility of additionally tack welding at spaced points along the tubes as hereinafter discussed and it is for this reason that I state that the welding should be confined to substantially only the ends of the tubes. In any event the side welds should be only a small fraction of the length of the tubes. Preferably the edges of the ends of the tubes are chamfered before fabrication to facilitate welding and to reduce the possibility of having to square the ends of the sections before securing a header, etc., thereto. It will be apparent to those skilled in the art however, that in some embodiments such chamfering will not be necessary.

In making the welds, the first step is to make the welds between the tubes across the ends thereof. With relatively short tubes this will be the only weld that is made between the tubes. Where longer tubes are used and side welds are to be made, the tubes are first allowed to cool before the side welds are made extending down the sides of the tubes only a small fraction of their length. Since the tubes normally have rounded corners, it will not be necessary to chamfer the sides of the tubes for the rounded corners will form a groove for the side welds. With long tubes it may be desirable to make short tack welds at spaced intervals along the length of the tubes. Where this is to be done the face plate, with the tubes thereon, should be positioned vertically. The lower ends of the tubes should be closed, which may be done by pressing a sheet of rubber gasket across the lower ends of the tubes. The tubes should then be filled with a coolant, e.g. water. It may be desirable to do this before making any of the side walds. The coolant, in conjunction with the short length of any side welds, forestalls the introduction of stresses that might result in distortions. After the welding is completed the section is removed from the face plate.

After the sections have been completed, they are assembled into the finished vessel. This is relatively simple since each section is planiform and rigid. The sections are placed side by side on a suitable supporting plane. Such a plane may be formed of several rails, e.g. "I" beams. Another procedure is to place two sections to be joined on the face plate used in the production of the sections with the line of juncture between the sections approximately in the middle of the plate. If the sections extend any substantial distance beyond the edges of the plate, outboard supports may be employed. Clamps may be used to hold the sections in place, but, since each section is planiform and rigid, no substantial alignment pressure is needed as was used in the production of each section. The welding procedure previously described is used to attach each section to the other.

A suitable closure then is provided for the ends of the tubes to complete the enclosed vessel. In the embodiment hereinafter described this is done by welding a header across each end of the tubes, but other procedures will be apparent to those skilled in the art and the one selected will depend on the form of the desired finished vessel. Another proceedure would be to drill communicating holes in the tubes before the assembly of the sections and to cover the ends of the tubes with a flat plate. It is even possible that in some embodiments the ends may be left open.

As previously mentioned the rounded corners of the tubes will form grooves across the face of the vessel. In some embodiments the grooves will present no problem. Where the grooves are undesirable, the face of the vessel may be covered with a sheet of metal, plastic, etc. The particular material employed for the covering sheet will depend upon the application for which the vessel is to be used. Likewise the manner in which the sheet is held in place will depend upon the application. It might be held in place by applying a vacuum along the grooves below the covering sheet. The use of an adhesive, e.g. casein or synthetic resin glue, between the tubes and the covering sheet will prove to be the most desirable attachment for most applications. Since the covering sheet is not subjected to the internal pressure of the vessel, the strength of the bond need only be sufficient to hold the sheet in place.

In FIGURES 1 and 2 a rigid plate, generally 10, is employed which has the upper surface 11 thereof finished to form a plane. Vertical members 12 are attached to plate 10 and to cross members 13 by means of bolts 14. The tubes 15 from which the vessel is to be manufactured are pressed down against surface 11 by "I" beams 16 and screws 17 threaded into cross members 13. Handwheels 18 are attached to screws 17 and are used to rotate the screws in applying or relieving the pressure on the tubes. The number of screws and "I" beams used to apply pressure to the tubes will depend upon the particular application, but a sufficient number should be used so that the tubes are held flat against surface 11 throughout the length of the tubes.

The tubes are pressed together against a backing bar 21. In order to provide versatility, bar 21 is provided with a plurality of downward pins 22 that are receivable in various holes 23 in plate 10. At the opposite side a plurality of screws 24 are threaded through vertical member 12 to apply pressure to tubes 15 through an "I" beam 25. Screws 24 are provided with hand wheels 26.

In making a freezing plate having an overall size of about 150″ by 54″ I have used fifty 2″ by 3″ rectangular steel tubes having 3/16 inch walls. The tubes were 48″ long and ran the width of the plate. The remaining 6″ in width consisted of a header at each end of the tubes and formed of the same tubing. The plate was made in sections, five sections consisting of eight tubes, with one of ten tubes. Before assembly, the four sides of each end of the tubes were chamfered as seen at 29 in FIGURE 3. The tubes of each section were juxtaposed on the surface 11 as seen in FIGURES 1 and 2. Wheels 18 were turned to tighten the tubes lightly against surface 11. Wheels 26 were then turned to securely clamp the tubes together, after which, wheels 18 were again turned to clamp the tubes tightly against surface 11. Sufficient clamping pressure should be exerted to straighten any twists or turns in the tubing. The tubes were then welded together across the ends in the V grooves formed by the chamfers in the adjacent sides of the tubes. The end welds thus formed are illustrated by the welds 27. After the end welds have cooled, side welds 28 were made for a distance of about 1″ to 1½″. In this embodiment it was not necessary to do any tack welding at spaced points between the side welds 28. After finishing the welding, wheels 18 and 26 were turned to release the section from the face plate.

The plate 10 could be used for the assembly of the sections or rails could be used for that purpose. To use plate 10, bolts 14 are unscrewed to detach the clamping structure from the plate and backing bar 21 is lifted off. The two sections to be joined are placed in juxtaposition on plate 10 with the line of juncture between the two being about in the center of the plate. Particularly as the assembly of the vessel progresses and it increases in size, outboard supports should be provided to prevent any undue deflection from damaging the vessel. C clamps are used to hold the sections in position on plate 10 as the sections are welded together. At the line of juncture between the sections welds are first made at each end corresponding to welds 27. After cooling, side welds corresponding to welds 28 are completed.

After the sections have been assembled a header 30 (FIGURE 3) was welded to each end to complete the vessel. In the described embodiment the header is made from the same tubing as the remainder of the vessel. Holes 31 are bored therein to provide communication between the individual tubes 15 and the header. Thereafter the header is attached by welds 32. The header is provided with suitable coolant connections, not shown. To provide a surface not interrupted by grooves 35, a sheet 36 of 28 gauge stainless steel was glued to the sides of tubes 15 and header 30.

The foregoing description of a specific embodiment is for the purpose of complying with 35 U.S.C. 112 and should not be construed as imposing unnecessary limitations on the appended claims since modifications thereof will be apparent to those skilled in the art. For example, various other clamping structures, e.g. hydraulic cylinders, could be used in place of those described; the described sequence of clamping operations could be changed; etc.

I claim:
1. The method of manufacturing a planiform faced vessel from rectangular tubes, said method comprising juxtaposing a plurality of said tubes, aligning one exposed side of each of said tubes in a plane, pressing the adjacent sides of said tubes together, and while holding said tubes in said position welding said tubes together substantially only at the ends of said tubes.

2. The method of manufacturing a planiform faced vessel from rectangular tubes, said method comprising juxtaposing a plurality of said tubes against a plane surface, holding said tubes flat against said surface and clamping said tubes together, and while holding said tubes in said position welding said tubes together substantially only at the ends of said tubes.

3. The method of manufacturing a planiform faced vessel from rectangular tubes, said method comprising juxtaposing a plurality of said tubes against a plane surface, holding said tubes flat against said surface and clamping said tubes together, and while holding said tubes in said position welding said tubes together across the end edges thereof and subsequently welding said tubes together along the sides for only a small fraction of the length of said tubes.

4. A method as set forth in claim 3 wherein at least a portion of the side weld is adjacent the ends of the tubes.

5. The method of manufacturing a planiform faced vessel from rectangular tubes, said method comprising making a plurality of sections, each section being formed by juxtaposing a plurality of said tubes, aligning one exposed side of each of said tubes in a plane, pressing the adjacent sides of said tubes together, while holding said tubes in said position welding said tubes together substantially only at the ends of said tubes, positioning one side of each section in a plane with the adjacent tubes at the end of the sections in juxtaposition, and while holding said sections in said position welding said sections together substantially only at the ends of said tubes.

6. The method of manufacturing a planiform faced vessel from rectangular tubes, said method comprising making a plurality of sections, each section being formed by juxtaposing a plurality of said tubes against a plane surface, holding said tubes flat against said surface and clamping said tubes together, while holding said tubes in said position welding said tubes together substantially only at the ends of said tubes, positioning one side of each section in a plane with the adjacent tubes at the ends of the sections in juxtaposition, and while said sections are in said position welding said sections together substantially only at the ends of the tubes.

7. The method of manufacturing a planiform faced vessel from rectangular tubes, said method comprising juxtaposing a plurality of said tubes, aligning one exposed side of each of said tubes in a plane, pressing the adjacent sides of said tubes together, while holding said tubes in said position welding said tubes together substantially only at the ends of said tubes, and welding a rectangular tube across the ends of said tubes to form a header.

8. The method of manufacturing a planiform faced vessel from rectangular tubes, said method comprising making a plurality of sections, each section being formed by juxtaposing a plurality of said tubes, aligning one exposed side of each of said tubes in a plane, pressing the adjacent sides of said tubes together, while holding said tubes in said position welding said tubes together substantially only at the ends of said tubes, positioning one side of each section in a plane with the adjacent tubes at the ends of the sections in juxtaposition, while holding said sections in said position welding said sections together substantially only at the ends of the tubes, and welding a header across the ends of said tubes.

9. The method of manufacturing a planiform faced vessel from rectangular tubes, said method comprising chamfering the ends of said tubes, dividing said tubes into groups, forming each group into a section, each section being formed by juxtaposing the tubes of the group against a plane surface, holding said tubes flat against said surface and clamping said tubes together, while holding said tubes in said position welding said tubes together across the ends thereof and welding said tubes together along the sides for only a small fraction of the length of said tubes, positioning one side of each section in a plane with the adjacent tubes at the ends of the sections in juxtaposition, while said sections are in said position welding said sections together across the ends of the tubes and along the sides for only a small fraction of the length of said tubes, and welding a closure across the ends of the tubes.

References Cited in the file of this patent
UNITED STATES PATENTS

| | | |
|---|---|---|
| 389,144 | Gathmann | Sept. 4, 1888 |
| 697,560 | Steinmetz | Apr. 15, 1902 |
| 1,615,591 | Mallory | Jan. 25, 1927 |
| 1,622,664 | Murray et al. | Mar. 29, 1927 |
| 2,024,379 | McCraith | Dec. 17, 1935 |
| 2,172,080 | Fay et al. | Sept. 5, 1939 |
| 2,175,615 | Reed et al. | Oct. 10, 1939 |
| 2,249,723 | Orr | July 15, 1941 |
| 2,495,150 | Van Deventer | Jan. 17, 1950 |
| 2,601,973 | Jensen | July 1, 1952 |
| 2,655,181 | Cooper | Oct. 13, 1953 |
| 2,660,155 | Chapman | Nov. 24, 1953 |
| 2,667,526 | Stumbock | Jan. 24, 1954 |
| 2,726,516 | Bayston | Dec. 13, 1955 |
| 2,734,259 | Beck | Feb. 14, 1956 |
| 2,793,835 | Woods | May 28, 1957 |
| 2,804,285 | Peterson | Aug. 27, 1957 |
| 2,874,941 | Woodlard | Feb. 24, 1959 |
| 2,878,560 | Gier | Mar. 24, 1959 |

OTHER REFERENCES

"Inexpensive Carbon Plates for Grenet Batteries, etc." by Chas. Fetzes Scientific American, Oct. 27, 1888, page 264.